Figure 1:
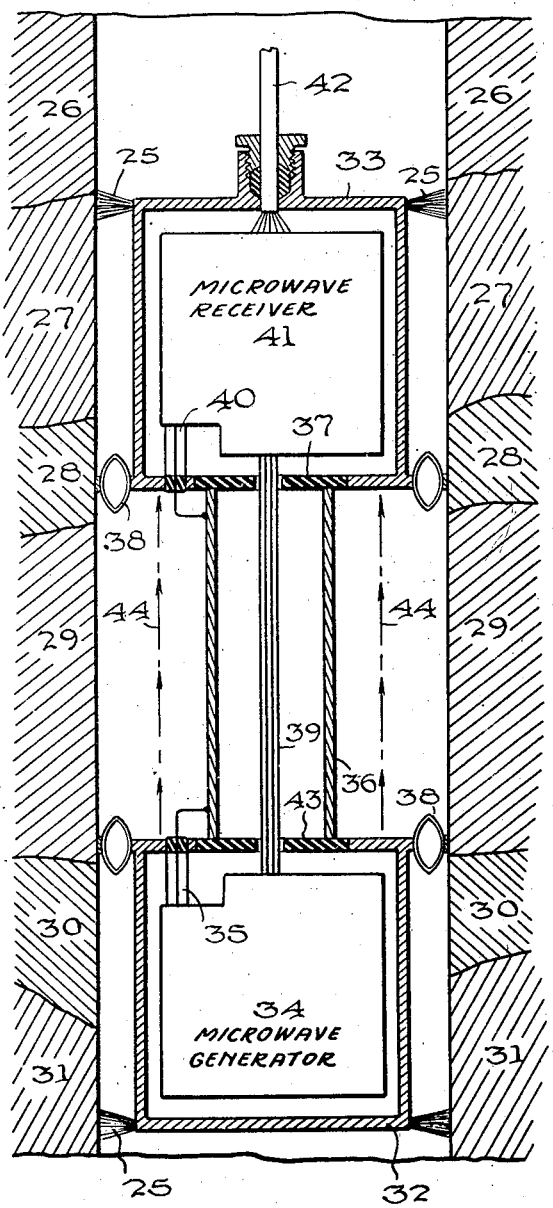

Dec. 14, 1948.    M. MUSKAT ET AL    2,455,940
METHOD OF GEOPHYSICAL EXPLORATION BY MICROWAVES
Filed Nov. 28, 1944    2 Sheets-Sheet 1

Inventor
MORRIS MUSKAT
NORMAN D. COGGESHALL their Attorney

Dec. 14, 1948.  M. MUSKAT ET AL  2,455,940
METHOD OF GEOPHYSICAL EXPLORATION BY MICROWAVES
Filed Nov. 28, 1944  2 Sheets-Sheet 2
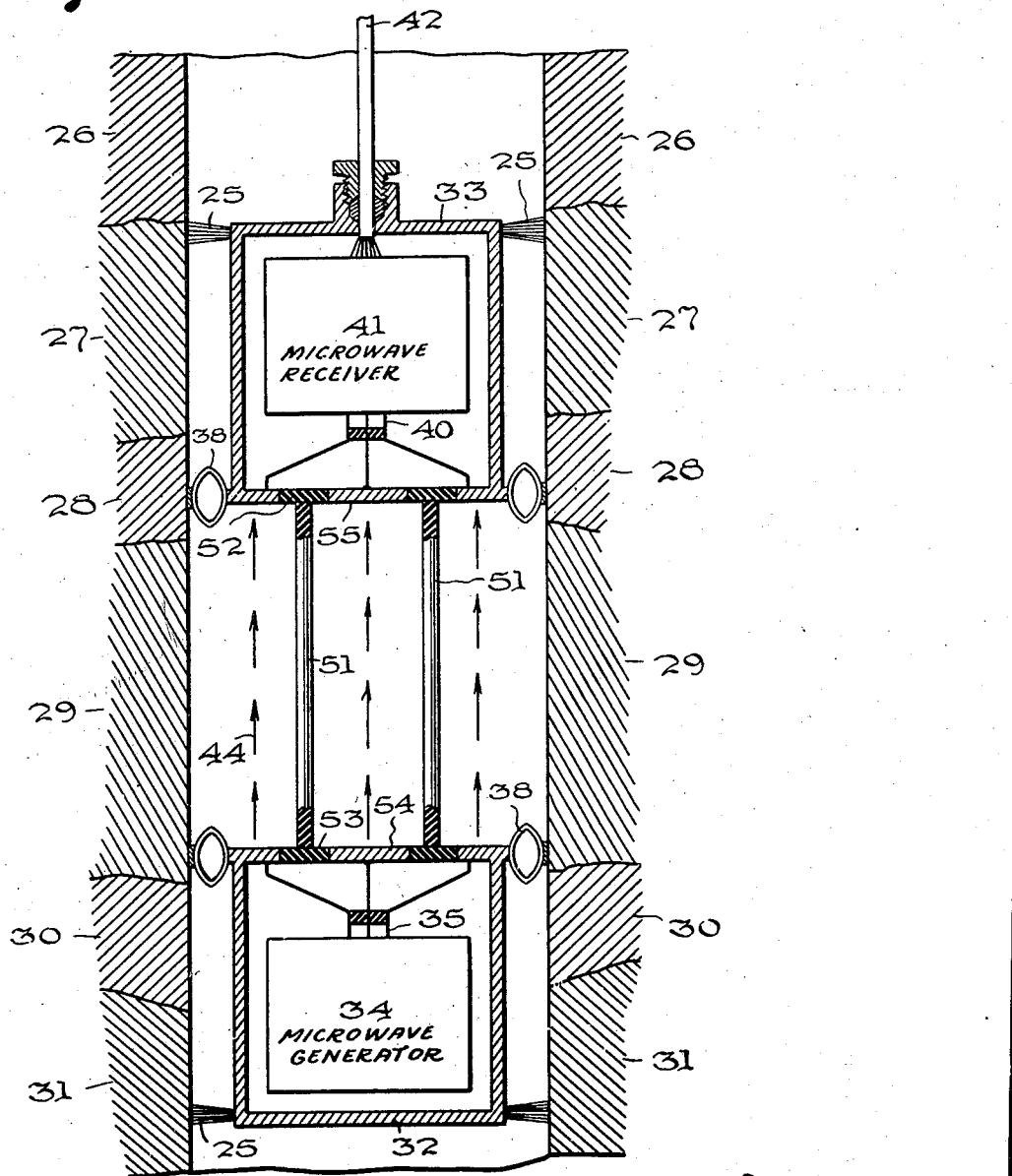
Inventors
MORRIS MUSKAT
NORMAN D. COGGESHALL Patented Dec. 14, 1948

2,455,940

UNITED STATES PATENT OFFICE 2,455,940

METHOD OF GEOPHYSICAL EXPLORATION BY MICROWAVES

Morris Muskat, Oakmont, and Norman D. Coggeshall, O'Hara Township, Allegheny County, Pa., assignors to Gulf Research & Development Company, Pittsburgh, Pa., a corporation of Delaware Application November 28, 1944, Serial No. 565,514

1 Claim. (Cl. 175—182)

This invention concerns a method of geophysical exploration, more particularly a geophysical method of logging uncased boreholes. This invention depends for its novelty on the use of microwaves for determining the characteristics of formations encountered in a borehole. In the drilling of wells, particularly oil wells, the problem of determining the nature of the formation traversed is an important one. The driller's log of the formation as reflecting the reaction of the formation to the drill is not always reliable. Coring when resorted to, is slow and expensive and ofttimes unreliable. Electrical logging and other logging methods have been used with considerable success but fail in many cases to locate strata of particular interest, or have insufficient resolving power to indicate very thin beds, or to differentiate between beds having very similar characteristics.

In the method of this invention, a new principle is applied for obtaining information regarding subsurface strata. It involves the transmission of microwave radiation down the well bore and the determination of its propagation and attenuation characteristics at various depths. By microwave radiation is meant electromagnetic energy whose frequency is higher than that used for conventional broadcasting, and lying in the region of wave length from several meters to fractions of a millimeter.

Microwaves may be transmitted with very little attenuation in so-called wave guides. These guides are tubular conductors which may either be empty or filled with a dielectric material. The radiation travels along the interior of these guides and penetrates the guiding conduit only slightly. The efficiency of transmission or the degree of attenuation of the microwave energy along the guide is quantitatively related to the conductivity and other electrical properties of the conduit material. Metallic bodies easily reflect or, if properly arranged transmit along their surface, these high frequency microwave radiations, while dielectric or insulating materials are essentially transparent. The nature of the wall of the borehole may thus be determined by causing it to be the guiding conduit for a microwave system.

There are two advantages to be gained by the use of microwave instead of longer wave length electromagnetic energy. Because of the very short wave length of microwaves the resolving power in detecting changes in the characteristics of the wave guide, namely, the formations adjacent the borehole, will be greater. In general, a wave system can experience characteristic changes which have the same order of dimension as the wave length. Since microwaves have wave lengths generally less than one meter, they are ideal for electrically detecting the fine structure of stratified formations.

Many formations have electrical properties which are so similar that heretofore known methods have not been able to discriminate between them. By the use of microwaves the contrast in propagation properties will be greater, and hence a conjunction between conducting and insulating material will be more easily detected. The use of microwaves will also to some extent reveal the surface nature of the formations encountered and this property is useful in further differentiating various layers.

It is accordingly an object of this invention to provide a borehole logging method which will have improved resolving power in the detecting of thin beds.

It is another object of this invention to provide a logging method which will have improved contrast between formations.

Another object of this invention is to provide means for logging boreholes by the application of microwaves to the surface presented by the formation in the borehole traversing it.

Another object of this invention is to provide a method of measuring the electrical properties of the surface of the formations encountered in a borehole.

Figure 2:
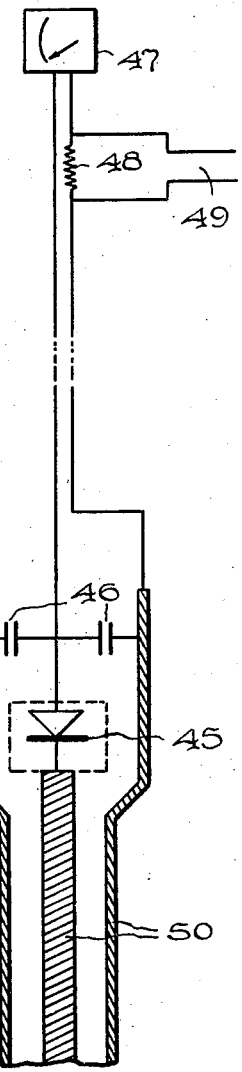

Details of the invention will be more apparent from a study of the accompanying drawings, in which Fig. 1 shows one apparatus for the application of this invention, Fig. 2 shows a detector for detecting and measuring microwave energy in a borehole and Fig. 3 shows an embodiment of our invention in which the microwave generator has self-contained power supply.

Referring to Fig. 1, which is a cross section of the earth and the borehole penetrating earth formations 26, 27, 28, 29, 30, 31, the apparatus of this invention is shown supported on electric conductor cable 42. Cable 42 is wound on a reel at the surface and there are provided conventional means for measuring the length of cable fed down into the hole. Also on the surface there may be conventional recording devices or control apparatus for other investigations simultaneously made in the well according to well known procedures.

The apparatus in the well consists of a microwave generator and a microwave receiver spaced a short distance apart. These are respectively housed in metal cases 32 and 33, Fig. 1, and connected by metal tube 36 which is insulated from the cases. Numeral 32 indicates a watertight case containing a conventional microwave generator 34. The unit 34 may conveniently be a Klystron or other velocity modulated electron oscillator well known in the art as means for generating microwave energy. Such a microwave generator is described for instance in the book "Ultra-High Frequency Techniques," by Brainard et al., p. 338 (1942), Van Nostrand & Co., New York. Power is supplied to it through cable 42 and wires 39. The microwave energy generated is fed out of case 32 through coaxial cable 35. The sheath of this cable connects to the conducting case 32, while the central wire connects to conducting tube 36. Insulated section 43 of the case serves to insulate tube 36 from case 32. Electrical contact is made between case 32 and the formations in the borehole by means of springs 38. These springs may alternatively also have the form of wipers or scrapers as indicated by 25 for removing mud from the sides of the hole, and thus ensure encountering a clean surface. Microwaves are generated by this system and these waves travel up the annular space between the walls of the borehole and the tube 36. Since tube 36 is a good conductor, any attenuation which the microwaves suffer is a function of the characteristics of adjacent formations. After passing along the borehole a short distance, generally of the order of several diameters of the borehole, they are picked up by unit 41 to be described in detail later in connection with Figure 2 housed in conducting case 33. The microwave energy is fed in through coaxial cable 40. Insulator 37 serves to insulate conducting tube 36 from conducting case 33. An indication of the energy picked up by unit 41 is fed to the surface through cable 42.

Fig. 2 shows details of a detector which may be used to pick up microwave energy such as may be used in unit 41 of Fig. 1. Numeral 50 represents a coaxial cable carrying the energy into the receiver case. In series with a central conductor of this cable is a crystal rectifier 45. Numeral 46 represents a capacity which bypasses any high frequency unrectified energy and across this condenser an easily measurable D.-C. potential is developed. This potential may be measured by means of current meter 47, or, if desired, the potential across resistor 48 may be amplified by a conventional amplifier connected to wires 49 and recorded by conventional means at the surface.

Because of the symmetry of units 41 and 34 in Fig. 1 they may be interchanged in position without affecting the operation of the invention. Alternatively, also, the generator unit 34 may be made to have self-contained power supply, thus eliminating the need for cables 39. Elimination of cables 39 also eliminates need for conducting tube 36 and permits use of the borehole alone as a wave guide. Such an embodiment is shown in Fig. 3.

In Fig. 3 the transmitter case 32 is suspended below the receiving unit case 33 by means of insulating supports 51 having the form of one or more insulating rods which do not interfere with the microwave transmission. Generator 34 may be connected to antenna 54 by means of coaxial cable 35, the sheath of this cable being fanned out to the conducting case 32 and the central conductor connected to antenna 54. Microwaves will be radiated into the borehole, the latter acting as a wave guide, so that the energy follows up the borehole as indicated by the arrows 44. The energy is picked up by receiving antenna 55 which is insulated from case 33 by means of insulation 52. Coaxial cable 40 leads the energy into receiver 41 where it is detected or recorded or appropriate signals sent to the surface over cable 42. Other numerals on Fig. 3 indicate parts having the same function as in Fig. 1.

We have thus indicated an apparatus for making measurements according to the method of this invention. In practice the generator may be operated to supply constant microwave energy and the energy picked up by receiver (Fig. 2) recorded as a function of depth. Still another way of practicing the invention consists in using a generator whose microwave frequency is varied over appropriate limits, as for instance by driving the Klystron adjusting screws by means of a reciprocating motor. This device being housed in case 32. A record of the energy picked up from such a variable frequency generator will indicate strata having unusual dispersion characteristics or anomalous absorption. These effects are closely associated with surface structure of the wave guide material, namely, the walls of the borehole.

In order to successfully apply the method of borehole logging by means of microwaves, it is necessary to remove from the borehole any conducting material, such as drilling mud or salt water. Holes drilled by cable tool methods and which are dry are advantageously logged by our invention. Rotary drill holes may first be flushed or conditioned with fresh water or, more preferable, an oil base or insulating drilling fluid may be used. Since the microwaves travel on the surface of conductors, any conducting mud cake must be removed from the walls of the hole as by means of scrapers 25 as indicated in Fig. 1.

The invention is not to be construed as limited to the apparatus herein set forth, as this is merely illustrative of one means of carrying out our method. Other types of microwave generators or detectors known in the art may be used within the scope of our invention. The distance between the microwave generator and receiver may be varied to suit the geological conditions to be logged, as may also the frequency of the microwaves employed. Higher frequencies permit the generator and receiver to be placed closer together and this improves the resolution of detailed geological bedding.

What we claim is:

A method of earth testing for use in logging a bore-hole comprising replacing the borehole fluid by an insulating medium, scraping the walls of the borehole substantially free of extraneous conducting material, generating microwave energy, transmitting microwave energy via the wall of a selected portion of the borehole, receiving said microwave energy and measuring a characteristic value of the received energy.

MORRIS MUSKAT.
NORMAN D. COGGESHALL.

REFERENCES CITED

The following references are of record in the file of this patent:

UNITED STATES PATENTS

| Number | Name | Date |
| --- | --- | --- |
| 1,838,371 | Deardorff | Dec. 29, 1931 |
| 2,075,808 | Fliess | Apr. 6, 1937 |
| 2,139,460 | Potapenko | Dec. 6, 1938 |
| 2,230,502 | Pearson | Feb. 4, 1941 |
| 2,271,951 | Pearson | Feb. 3, 1942 |
| 2,334,475 | Claudet | Nov. 16, 1943 |
| 2,400,678 | Archie | May 21, 1946 |

OTHER REFERENCES

Proceedings of the Physical Society, vol. 56, part 1, January 1, 1944, pp. 1-8, article by D. Rogers.